United States Patent [19]

Furukoshi

[11] Patent Number: 5,235,260
[45] Date of Patent: Aug. 10, 1993

[54] WIPER CONTROLLER

[75] Inventor: Hiroyuki Furukoshi, Toyohashi, Japan

[73] Assignee: Asmo Co., Ltd., Japan

[21] Appl. No.: 902,572

[22] Filed: Jun. 22, 1992

[30] Foreign Application Priority Data

Jun. 28, 1991 [JP] Japan .................................. 3-159139

[51] Int. Cl.⁵ .............................................. B60S 1/08
[52] U.S. Cl. ................................... 318/443; 318/452; 318/484; 318/DIG. 2
[58] Field of Search ............... 318/264, 265, 266, 272, 318/275, 277, 281, 282, 283, 285, 286, 443, 444, 445, 446, 452, 484, DIG. 2; 15/250.12, 250.16, 250.17

[56] References Cited

U.S. PATENT DOCUMENTS

| | | | |
|---|---|---|---|
| 4,544,870 | 10/1985 | Kearns et al. | 318/444 |
| 4,692,677 | 8/1987 | Bauer et al. | 318/443 |
| 4,733,142 | 3/1988 | Bicknell | 318/283 |
| 4,733,147 | 3/1988 | Muller et al. | 318/443 |
| 4,823,058 | 4/1989 | Buchanan, Jr. et al. | 318/443 |
| 4,825,134 | 4/1989 | Tracht | 318/443 |
| 4,859,919 | 8/1989 | Tracht | 318/444 |
| 5,030,899 | 7/1991 | Nishibe et al. | 318/444 |

FOREIGN PATENT DOCUMENTS 2283550 11/1990 Japan .
3-5542 1/1991 Japan .

Primary Examiner—Bentsu Ro
Attorney, Agent, or Firm—Stetina and Brunda

[57] ABSTRACT

A wiper controller comprises a power source, a wiper drive motor, a power switch, a wiper switch, a position detector for detecting the position of a wiper on the windshield of a vehicle, a drive control circuit for controlling the power supply to the motor, and a switch circuit for controlling the power supply to the drive control circuit. The drive control circuit is connected to the power source, and controls the power supply to the motor from the power source, based on the ON/OFF status of the power switch and wiper switch, and also based on information from the position detector. The drive control circuit causes the wiper to stop at a predetermined position on the windshield. The switch circuit allows power to be supplied to the drive control circuit when the power switch is switched on, and further allows the power to be supplied, for a predetermined period of time, after the power switch is switched off.

12 Claims, 2 Drawing Sheets

FIG.2

| Power supply to signal processor 2 | Ignition switch 3 | Wiper switch 7 | Cam switch 8 | Level of output terminal OUT1 | Transistor TR3 (i.e., motor 5) |
|---|---|---|---|---|---|
| YES | ON | ON | OFF/ON | H | ON |
| | ON | OFF | OFF | H | ON |
| | ON | OFF | ON | L | OFF |
| | OFF | ON | OFF | H | ON |
| | OFF | ON | ON | L | OFF |
| | OFF | OFF | OFF | H | ON |
| | OFF | OFF | ON | L | OFF |
| NO (power shut) | | | | ground | OFF |

WIPER CONTROLLER

BACKGROUND OF THE INVENTION

This application claims the priority of Japanese Patent Application No. 3-159139 filed on Jun. 28, 1991, which is incorporated herein by reference.

FIELD OF THE INVENTION

The present invention generally relates to a wiper controller for controlling a wiper for a window of a vehicle. More particularly, this invention relates to a controller which can stop the wiper at a predetermined position when the wiping process is complete.

DESCRIPTION OF THE RELATED ART

A conventional wiper controller comprises a motor for driving a wiper, and a control circuit for controlling the power supply to the motor, from a power supply or battery, in accordance with the status of an ignition switch and a wiper switch. This conventional wiper controller receives power from the battery when the ignition switch, which activates the engine, is set on. When the wiper switch is switched on under this circumstance, the control circuit supplies power to the motor to drive the wiper. When the wiper switch is set off later, the control circuit controls the power supply to the motor so that the wiper stops at a predetermined stop position.

As the conventional wiper controller is connected via the ignition switch to the battery, it cannot receive power from the battery, unless the ignition switch is set on. If the driver erroneously switches the ignition switch off with the wiper switch on, such as when parking the vehicle, the power supply to the wiper motor from the battery is forcibly cut off. In this case, the wiper stops at an undesirable position on the windshield.

In such a position the wiper impairs the appearance of that vehicle. Further, the rubber blade of the wiper stopping in the center of the windshield may firmly stick on the window surface under exposure to the sunlight for an extended period of time. If the mark of the rubber blade of the wiper is left on the windshield, after activation of the wiper by switching the ignition switch on again, the mark would obstruct the driver's field of vision. Furthermore, if the window surface is dry at the time the wiper is activated by the re-switching of the ignition switch on, the wiper is likely to damage the windshield surface, and the wiper rubber blade wears out prematurely.

In order to remind the driver to switch off the wiper switch at the time of stopping the vehicle, the wiper controller may be connected directly to the battery, not via the ignition switch. This design keeps the wiper moving even when the ignition switch is switched off as long as the wiper switch remains on, reminding the driver to switch off the wiper switch. However, such this direct connection of the wiper controller to the battery will drain the battery dead soon.

SUMMARY OF THE INVENTION

Accordingly, it is a primary objective of the present invention to provide a wiper controller capable of stopping a wiper at a predetermined position when parking the vehicle.

To achieve the foregoing and other objects in accordance with the purpose of the present invention, the improved wiper controller is provided for controlling a windshield wiper. The wiper controller comprises a power source, a motor for driving the wiper, a power switch switchable between ON and OFF states, a wiper switch switchable between ON and OFF states to instruct activation and deactivation of the wiper, a position detector for detecting the position of the wiper on a window, a drive control circuit for controlling power supply to the motor from the power source to control the driving and deactivation of the wiper, and a switch circuit for controlling the power supply to the drive control circuit from the power source.

The drive control circuit permits the power source to be connected to the motor, when the power switch and the wiper switch are switched on to drive the wiper. The drive control circuit supplies power to the motor based on information from the position detector, until the wiper reaches a predetermined stop position, thereby stopping the wiper at the predetermined position on the windshield, when at least one of the power switch and wiper switch is switched off.

The switch circuit connects the power source to the drive control circuit, when the power switch is set on, and connects the power source to the drive control circuit for a predetermined period of time after the power switch is switched off.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawing in which:

FIG. 2 is a table summarizing the control levels of the wiper controller according to present invention.

DETAILED DESCRIPTION OF THE PREFERRED EMBODIMENT

Figure 1:
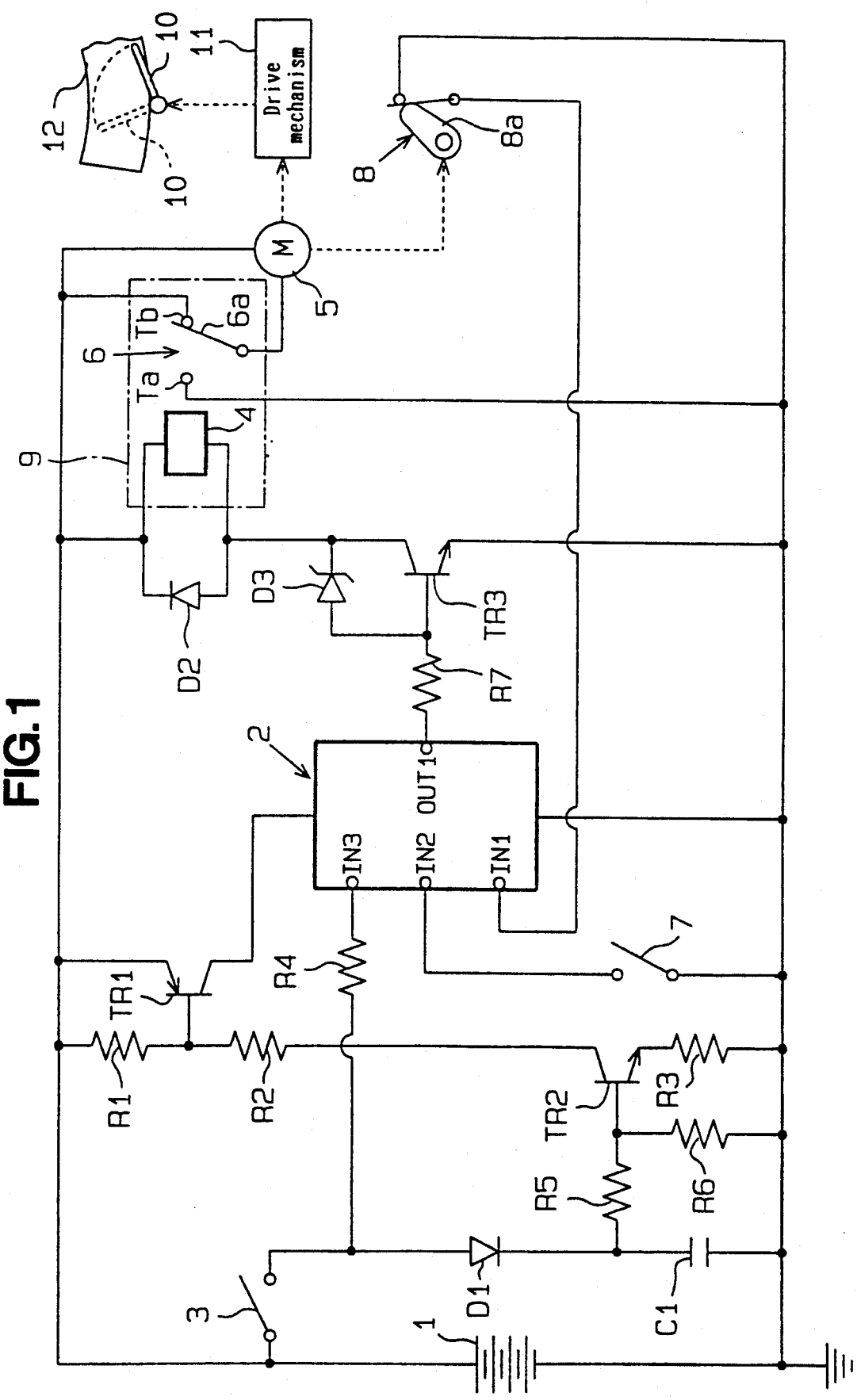
FIG. 1 is an electric circuit diagram of a wiper controller embodying the present invention.

A preferred embodiment of the present invention will now be described in reference to FIG. 1.

A wiper controller for a vehicle shown in FIG. 1 includes a motor 5 for driving a wiper 10, a signal processor 2 for controlling the motor 5, and a power source or battery 1 installed in the vehicle. The motor 5 is supplied with power from the battery 1.

The signal processor 2 has three signal input terminals IN1, IN2 and IN3 and one signal output terminal OUT1. The signal processor 2 prepares a control signal in accordance with the status of the input signals to the three input terminals IN1, IN2 and IN3, and transmits it along the output terminal OUT1. The signal processor 2 is connected via a PNP type transistor TR1 to the positive terminal of the battery 1, and is connected to the grounded negative terminal of the battery 1. The signal processor 2 operates on the power from the battery 1.

The transistor TR1 has its base and emitter connected together via a resistor R1. The base of the transistor TR1 is connected to the grounded negative terminal of the battery 1 via a resistor R2, an NPN type transistor TR2 and a resistor R3. The transistor TR2 has its base connected to the positive terminal of the battery 1 via a resistor R5, a diode D1 and an ignition switch 3. The diode D1 is provided in the forward bias direction to the battery 1.

The ignition switch 3 serves to start the engine. In the present wiper controller, the ignition switch 3 may be replaced with an accessory switch which connects or disconnects the power supply to various accessories, such as a radio. When the engine of the vehicle is running, the ignition switch 3 is on; and the switching off of the ignition switch 3 stops the engine. When the transistor TR2 is turned on by switching on the ignition switch 3, the transistor TR1 is turned on, supplying power to the signal processor 2. The signal processor 2 is functionable upon reception of the power and becomes inactive when the power is cut off.

The node between the diode D1 and the resistor R5 is connected, via a capacitor C1, to the negative terminal of the battery 1. Further, the node between the resistor R5 and the base of the transistor TR2 is connected, via a resistor R6, to the negative terminal of the battery 1. By turning on of the ignition switch 3, the battery 1 charges the capacitor C1. Even when the ignition switch 3 is switched off, therefore, the transistor TR2 is turned on only for a predetermined time, such as 15 seconds, by the electric charge accumulated in the capacitor C1.

Even after the ignition switch 3 is switched off, therefore, the signal processor 2 is supplied with power from the battery 1 due to the ON duration of the transistor TR1 for the predetermined time and is kept operatable. When the transistors TR1 and TR2 are turned off upon completion of the discharging of the capacitor C1, the signal processor 2 is disconnected from the battery 1. Thus, the transistors TR1 and TR2, the resistor R5, the capacitor C1, etc. constitute a switch circuit which controls the power supply to the signal processor 2.

The wiper controller shown in FIG. 1 further comprises a relay 9, which includes a solenoid coil 4 and a motor switch 6. The motor switch 6 has a switching lever 6a which contacts a contact point Ta or Tb in accordance with the activation state of the solenoid coil 4. With the coil 4 deactivated, the switching lever 6a contacts the contact point Tb which is connected to the positive terminal of the battery 1. When the coil 4 is activated, the switching lever 6a contacts the contact point Ta, which is connected to the negative terminal of the battery 1.

The solenoid coil 4 has one end connected to the positive terminal of the battery 1 and the other end connected, via an NPN type transistor TR3, to the negative terminal of the battery 1. A diode D2 arranged in the reverse bias direction to the battery 1 is connected in parallel to the solenoid coil 4. The diode D2 absorbs the surge which occurs by the induction of the solenoid coil 4, thus preventing the transistor TR3 from being damaged.

The transistor TR3 has its base connected, via a resistor $7, to the output terminal OUT1 of the signal processor 2. A Zener diode D3 is provided between the base and collector of the transistor TR3. The Zener diode D3 protects the transistor TR3 against the surge which occurs due to the induction phenomenon of the solenoid coil 4.

The motor 5 has one end connected to the positive terminal of the battery 1 and the other end connected to the switching level 6a of the motor switch 6. When the transistor TR3 is turned on, and the solenoid coil 4 is excited to switch the switching lever 6a to the contact point Ta, therefore, the motor 5 is supplied with the power from the battery 1. Thus, the signal processor 2, the transistor TR3, the relay 9, etc. form a drive control circuit to control the power supply to the motor 5.

Since the motor 5 is operatably coupled to the wiper 10 via a drive mechanism 11, including various mechanical devices, the wiper 10 is driven by the activation of the motor 5. A cam 8a forms a cam switch 8, and is provided on the output shaft of the motor 5. In this embodiment, the cam switch 8 is so arranged as to be set on when the wiper 10 is at a predetermined stop position on a windshield 12. The cam switch 8 may also be arranged so as to be set off when the wiper 10 is at the predetermined stop position.

The first input terminal IN1 of the signal processor 2 is connected via the cam switch 8 to the negative terminal of the battery 1 (i.e., ground). The signal processor 2 therefore detects the wiper 10 returning to the stop position by a high or low signal input to the input terminal IN1, which depends on the ON/OFF status of the cam switch 8.

The second input terminal IN2 of the signal processor 2 is connected to the negative terminal of the battery 1 (i.e., ground) via a wiper switch 7, which is operated by the driver in order to activate or deactivate the wiper 10. The signal processor 2 therefore detects the ON/OFF status of the wiper switch 7 by a high or low signal input to the input terminal IN2, which depends on the status of the wiper switch 7.

The third input terminal IN3 of the signal processor 2 is connected, via a resistor R4 and the ignition switch 3, to the positive terminal of the battery 1. The signal processor 2 therefore detects the ON/OFF status of the ignition switch 3 by a high or low signal input to the input terminal IN3.

The basic functions of the signal processor 2 will be discussed below with reference to FIG. 1. The function of the signal processor 2 will now be described. The switching on of the ignition switch 3 sets the signal level of the input terminal IN3 to a high level.

When the signal level of the input terminal IN2 becomes low, by switching the wiper switch 7 on, the signal processor 2 outputs a high-level signal from the output terminal OUT1 regardless of the ON/OFF status of the cam switch 8. As a result, the transistor TR3 is turned on. If the wiper switch 7 is switched off later, the signal processor 2 keeps the signal level of the output terminal OUT1 high as long as the cam switch 8 is in an OFF status (IN1=High) and as long as the wiper 10 is not located at the stop position. When the cam switch 8 is switched on (IN1=Low) by the wiper 10 returning to the stop position, the signal processor 2 switches the signal level of the output terminal OUT1 low, and turns off the transistor TR3.

When the ignition switch 3 is rendered off (IN3=Low) with the wiper switch 7 on (IN2=Low), the signal processor 2 keeps the signal level of the output terminal OUT1 high as long as the cam switch 8 is in an OFF status. As a result, the transistor TR3 is kept on. When the cam switch 8 is switched on as the wiper 10 returns to the stop position, the signal processor 2 switches the signal level of the output terminal OUT1 low, and turns off the transistor TR3.

With power being supplied to the signal processor 2, even when the ignition switch 3 and the wiper switch 7 are switched off almost simultaneously, the signal processor 2 keeps the signal level of the output terminal OUT1 high as long as the cam switch 8 remains off. When the cam switch 8 is switched on, as the wiper 10 returns to the stop position, the signal processor 2 switches the signal level of the output terminal OUT1 low. While the power supply to the signal processor 2 is cut off, the output terminal OUT1 is at the ground level.

An operational sequence of the wiper controller with the above-described structure will now be described. When the vehicle is parked, the ignition switch 3 and the wiper switch 7 are both switched off, and the wiper 10 is located at the preselected stop position, so that the cam switch 8 is switched on as shown in FIG. 1.

When the ignition switch 3 is switched on to start driving the vehicle, power is supplied from the battery 1 to the base of the transistor TR2, turning on the transistor TR2. Consequently, the transistor TR1 is turned on, supplying the power from the battery 1 to the signal processor 2, so that the signal processor 2 starts functioning.

When the driver sets the wiper switch 7 on while the ignition switch 3 is on, the signal processor 2 turns on the transistor TR3. As a result, the solenoid coil 4 is energized, and switches the switching lever 6a of the motor switch 6 to the contact point Ta from the contact point Tb. This will allow the power to flow from the battery 1 to the motor 5, which in turn activates the wiper 10 through the drive mechanism 11.

When the driver switches off the wiper switch 7, the signal processor 2 controls the transistor TR3 so as to stop the wiper 10 at the stop position, in accordance with the ON/OFF status of the cam switch 8. As long as the wiper 10 is not located at the stop position (SW8=OFF), the signal processor 2 keeps the transistor TR3 on to drive the motor 5. When the wiper 10 returns to the stop position (SW8=ON), the signal processor 2 turns off the transistor TR3, stopping the motor 5.

When it is desired to park the vehicle, the driver might switch off the ignition switch 3, and leave the wiper switch 7 on. In this case, even with the ignition switch 3 set off, the transistor TR2 is kept on for about 15 seconds due to the electric charges accumulated in the capacitor C1, so that the transistor TR1 stays on for the same period of time. Consequently, the signal processor 2 receives power from the battery 1 for as long as 15 seconds during which the signal processor 2 keeps functioning.

At this time, as in the previous case, the signal processor 2 keeps the transistor TR3 on, to drive the motor 5 as long as the wiper 10 is not at the stop position. When the wiper 10 returns to the stop position, the signal processor 2 turns off the transistor TR3, stopping the motor 5.

The duration of supplying charges from the capacitor C1 (15 seconds in this embodiment) is set long enough for the wiper 10 to complete its reciprocal wiping motion. Even after the ignition switch 3 is switched off, therefore, the signal processor 2 can keep the control operation until the wiper 10 returns to the stop position. After the capacitor C1 is completely discharged, the transistors TR1 and TR2 are turned off, cutting off the power supply to the signal processor 2 from the battery 1. The signal processor 2 will not therefore waste energy stored in the battery 1.

According to this embodiment, the wiper 10 can always be stopped at a predetermined stop position under any circumstance, even when the wiper switch 7 and/or the ignition switch 3 are switched off. It is therefore possible to prevent the rubber blade of the wiper 10 from stopping at a position other than the preselected stop position, and from sticking on the surface of the windshield. This will protect the wiper blade as well as the window.

In addition, since the wiper 10 will stop at the stop position when the vehicle is parked, the impairment of the appearance of the vehicle during parking is avoided. Further, since the power-line of the signal processor 2 is not directly connected to the battery 1, but rather via the transistor TR1, the battery will not be prematurely drained.

FIG. 2 summarizes the control levels of the wiper 10.

Although only one embodiment of the present invention has been described herein, it should be apparent to those skilled in the art that the present invention may be embodied in many other specific forms without departing from the spirit or scope of the invention. Particularly, it should be understood that the cam switch 8 in this embodiment for detecting the position of the wiper 10 may be operably coupled to one member which forms the drive mechanism 11, e.g., the rotational lever that rotates a pivot shaft to which the wiper arm is fixed.

Furthermore, while the present invention has been described in connection with the vehicle windshield, it should be understood to those skilled in the art, after reviewing the foregoing description that the invention can be used to regulate the wiping operation of wipers employed in various applications, such as tail gate and headlights.

Therefore, the present examples and embodiments are to be considered as illustrative and not restrictive, and the invention is not to be limited to the details given herein, but may be modified within the scope of the appended claims.

What is claimed is:

1. A wiper controller for controlling a wiper, comprising:
   a power source;
   a motor for driving the wiper;
   a power switch switchable between an ON and an OFF states;
   a wiper switch switchable between an ON and an OFF states for activating and deactivating the wiper;
   position detecting means for detecting the position of the wiper;
   drive control means connected to said power source, for controlling the power supply to said motor, in order to control the activation and deactivation of the wiper, whereby when said power switch and said wiper switch are switched on, said drive control means connects said power source to said motor, and when at least one of said power switch and wiper switch is switched off, said drive control means keeps supplying power to said motor until the wiper reaches a predetermined stop position, based on information from the position detecting means, for stopping the wiper at the predetermined position; and
   switch means for controlling the power supply to said drive control means, whereby said switch means allows said power source to be connected to said drive control means when said power switch is set on, and further allows power to be supplied to said drive control means for a predetermined period of time after said power switch is switched off.

2. The wiper controller according to claim 1, wherein said position detecting means is a cam switch drivably coupled to said motor, for detecting when the wiper has reached its predetermined stop position.

3. The wiper controller according to claim 1, wherein said drive control means includes:
   a signal processor for outputting a control signal based on input signals from said power switch, said wiper switch and said position detecting means; and
   relay means for electrically connecting said power source to said motor, and for electrically disconnecting said power source from said motor, based on the control signal from said signal processor.

4. The wiper controller according to claim 1, wherein said switch means includes:
   at least one switching element which is switched on when said power switch is set on, for permitting power to be supplied to said drive control means, from said power source; and
   timer means for rendering the switching element on, only for a predetermined period of time, after said power switch is switched off.

5. The wiper controller according to claim 4, wherein said timer means includes a capacitor which is charged when said power switch is on, and which discharges when said power switch is off.

6. A wiper controller for controlling a wiper, comprising:
   a power source;
   a motor for driving the wiper;
   a power switch switchable between an ON and an OFF states;
   a wiper switch switchable between an ON and an OFF states for activating and deactivating the wiper;
   position detecting means for detecting the position of the wiper;
   motor switch means for allowing power to be supplied to said motor, from said power source, or for inhibiting power from being supplied to control the activation and deactivation of the wiper;
   drive control means connected to said power source, for controlling said motor switch means, for the wiper to be driven to a stationary position, whereby, when said power switch and said wiper switch are switched on, said motor switch means is switched on to start said motor, and when at least one of said power switch and said wiper switch is switched off, the ON/OFF switching of said motor switch means is controlled so as to stop the wiper at a predetermined stop position, based on information from said position detecting means;
   first controller switch means for controlling power supply to said drive control means from said power source, in such a way as to allow power to be supplied to said drive control means, when said power switch is on, and to inhibit the power supply when said power switch is off; and
   second controller switch means for controlling power supply to said drive control means from said power source, in such a way as to allow power to be supplied to said drive control means for a predetermined period of time after said power switch is switched off.

7. The wiper controller according to claim 6, wherein said position detecting means is a cam switch drivably coupled to said motor for detecting when the wiper reaches said predetermined stop position.

8. The wiper controller according to claim 6, wherein said drive control means is a signal processor for outputting a control signal based on input signals from said power switch, said wiper switch and said position detecting means.

9. The wiper controller according to claim 8, wherein said motor switch means includes a relay for electrically connecting and disconnecting said power source to or from said motor, based on said control signal from said signal processor.

10. The wiper controller according to claim 6, wherein said first controller switch means includes at least one switching element which is switched on when said power switch is set on, and which is switched off when said power switch is set off.

11. The wiper controller according to claim 6, wherein said second controller switch means includes:
    at least one switching element which is switched on when said power switch is set on, and which is switched off when said power switch is set off; and
    timer means for rendering said switching element on only for a predetermined period of time even after said power switch is switched off.

12. The wiper controller according to claim 11, wherein said timer means includes a capacitor which is charged when said power switch is on, and which discharges when said power switch is off.

* * * * *